United States Patent [19]

Thirion de Briel et al.

[11] Patent Number: 5,174,426

[45] Date of Patent: Dec. 29, 1992

[54] FRICTION WHEEL FOR A CLUTCH

[75] Inventors: Jacques Thirion de Briel, Levallois-Perret; André Dalbiez, Argenteuil, both of France

[73] Assignee: Valeo, Cedex, France

[21] Appl. No.: 803,536

[22] Filed: Dec. 9, 1991

[30] Foreign Application Priority Data

Dec. 13, 1990 [FR] France .................. 90 15598

[51] Int. Cl.⁵ .......................................... F16D 13/64
[52] U.S. Cl. ............................ 192/107 C; 192/109 R
[58] Field of Search .............. 192/107 C, 107 R, 52, 192/109 R

[56] References Cited

U.S. PATENT DOCUMENTS

| | | | |
|---|---|---|---|
| 2,103,433 | 12/1937 | Newton | 192/107 C |
| 2,207,961 | 7/1940 | Wellman | 192/107 C |
| 2,794,526 | 6/1957 | Canfield | 192/107 C X |
| 4,260,048 | 4/1981 | Beccaris | 192/107 C |
| 4,377,225 | 3/1983 | Lech, Jr. et al. | 192/107 C |
| 4,828,083 | 5/1989 | Naudin | 192/52 |

FOREIGN PATENT DOCUMENTS 542578   1/1942  United Kingdom .
635041   3/1950  United Kingdom .
2140881 12/1984  United Kingdom .

*Primary Examiner*—Richard Lorence
*Attorney, Agent, or Firm*—Longacre & White

[57] ABSTRACT

A clutch wheel for a plate type friction clutch comprises a clutch disc carrying a plurality of friction pads spaced coaxially around it. Each friction pad consists of two pad elements arranged back to back and movable axially with respect to each other against the action of a Belleville ring inserted between them. This axial movement is controlled within predetermined limits by abutment means consisting of cooperating elements of the two friction pads, or of at least one of the friction pads and the clutch disc. The Belleville ring is precompressed in such a way that, within the limits of the axial movement defined by the abutment means, it works only on a part of its characteristic curve in which the reaction force which it exerts is substantially constant.

13 Claims, 5 Drawing Sheets

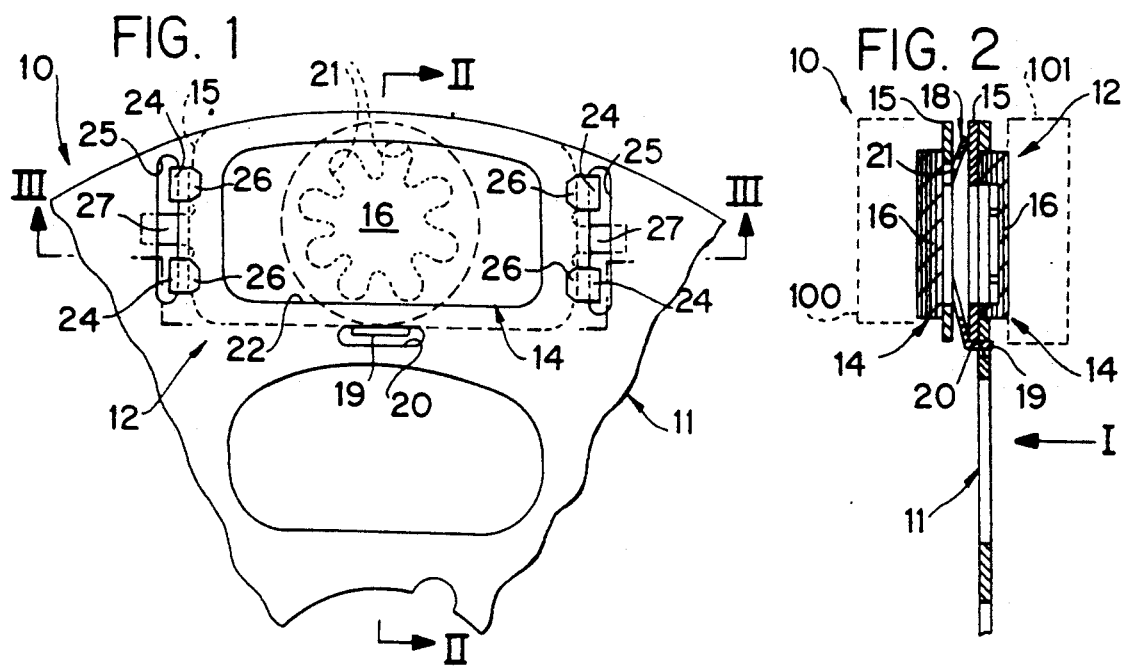
FIG. 1
FIG. 2
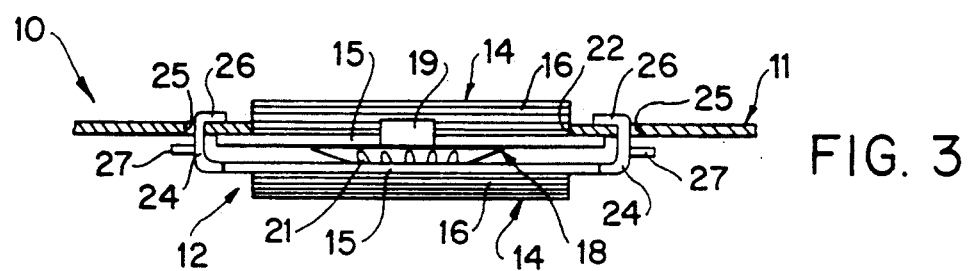
FIG. 3
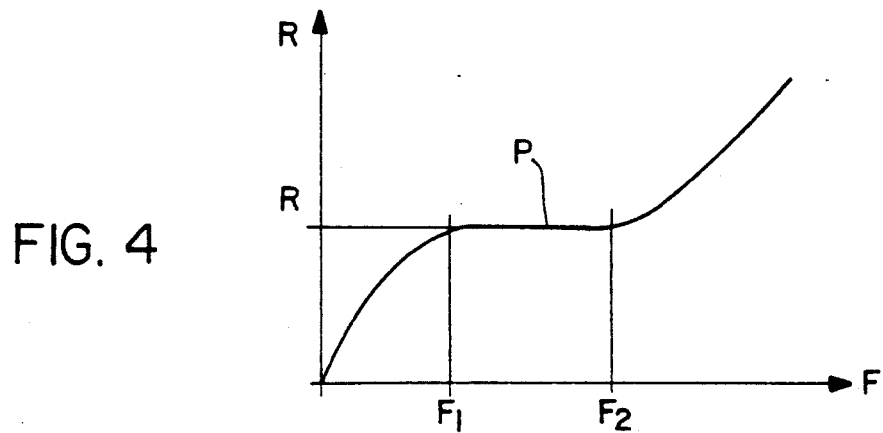
FIG. 4

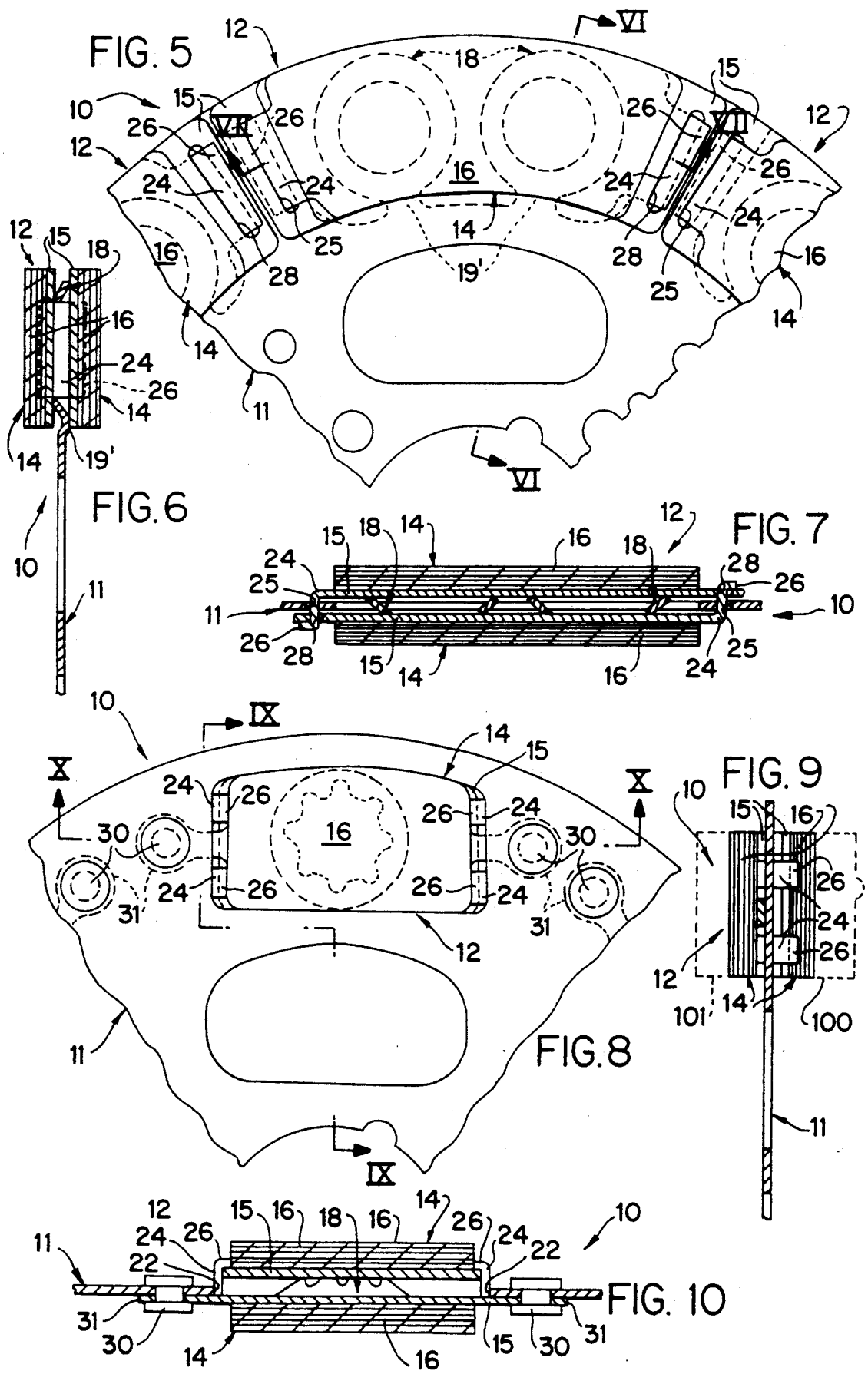

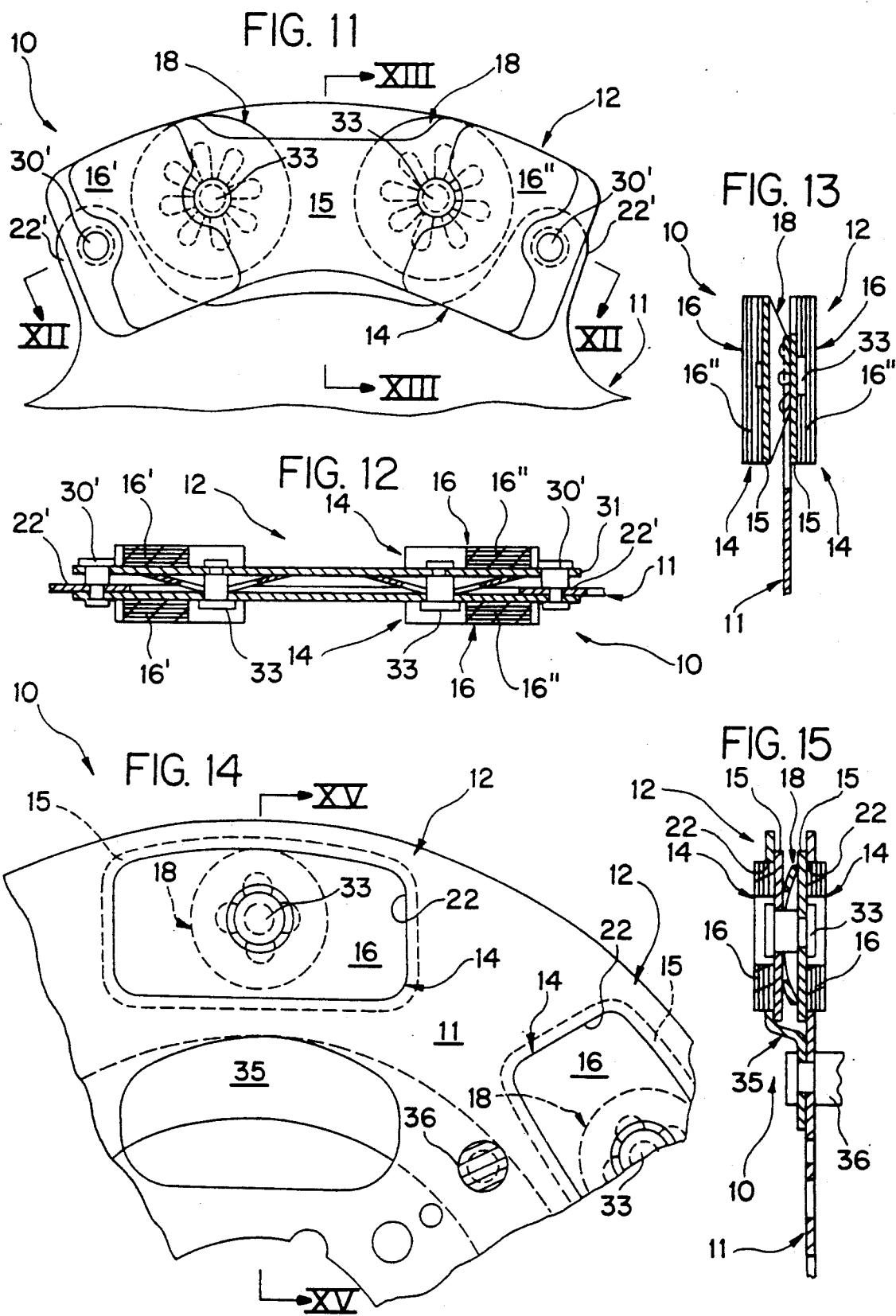

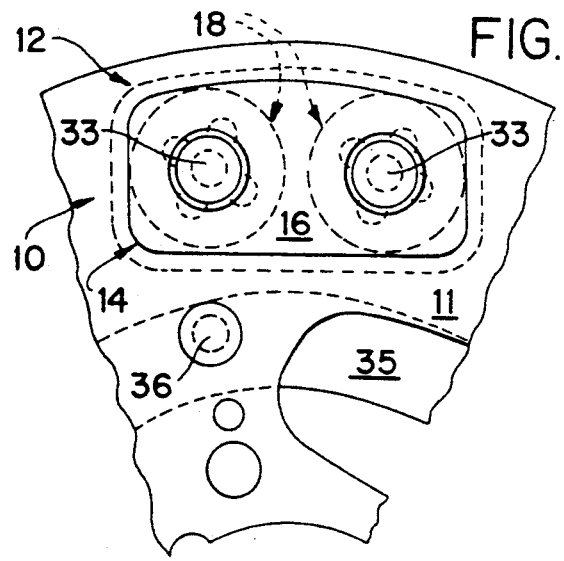
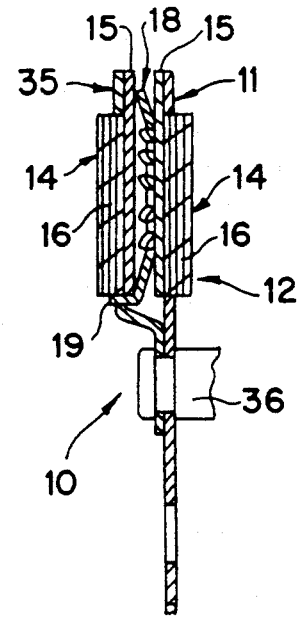
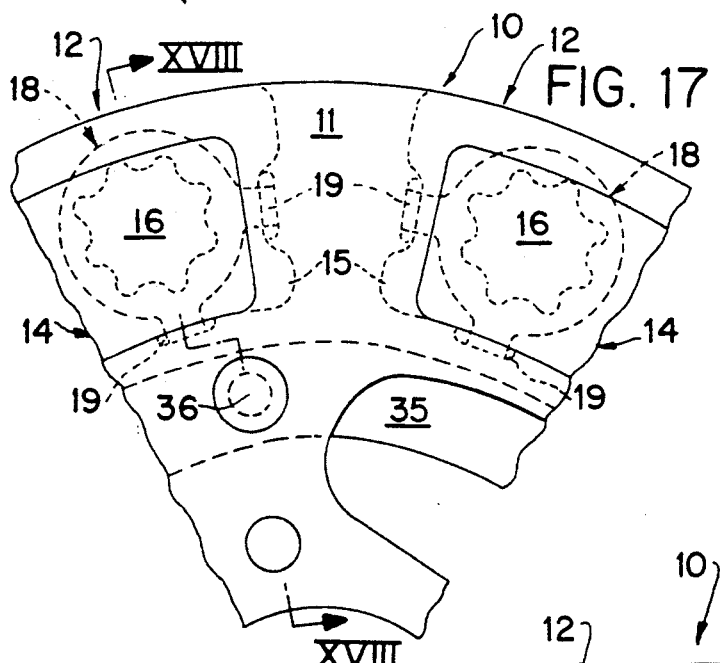
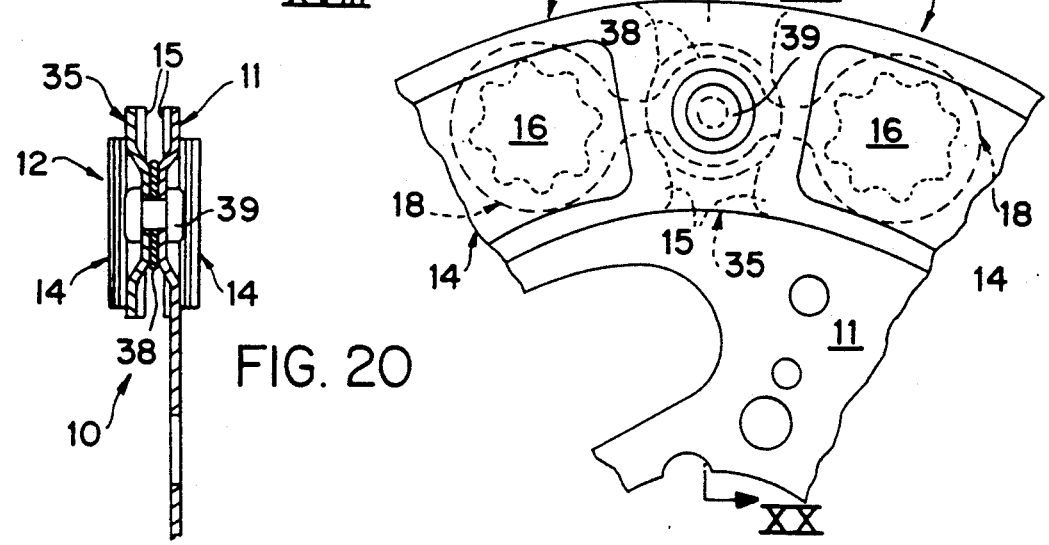

5,174,426

FRICTION WHEEL FOR A CLUTCH

FIELD OF THE INVENTION

The present invention relates to friction wheels, especially for a motor vehicle clutch, of the kind comprising a clutch disc with a plurality of friction pads carried by the clutch disc and spaced coaxially around the latter, with each friction pad being in the form of two pad elements arranged back to back so as to act on either side of the clutch disc. In such a clutch, each time the clutch is engaged, the friction pads are progressively gripped between a pressure plate and a reaction plate of the clutch.

BACKGROUND OF THE INVENTION

The friction effects in a plate type clutch, comprising a pressure plate, a reaction plate, and a clutch wheel having friction pads which are releasably gripped between the pressure plate and reaction plate, always lead to a tendency for the pressure plate to become worn into a conical profile. To a lesser extent the same effect is also observable in the reaction plate. The result is that the area over which the friction pads are subjected to pressure between themselves and the pressure and reaction plates becomes displaced radially inwards as the clutch becomes more worn. This results in unequal wear occurring in the friction pads, with a consequent reduction in their effectiveness and even, possibly, disintegration of the latter.

In the case of certain clutch wheels, for example especially in that which is described in the specification of U.S. Pat. No. 4,260,048, the two pad elements that constitute a friction pad are mounted for relative axial movement, under the influence of resilient means disposed between them and within the limits of a predetermined relative axial displacement which is controlled by abutment means. The resilient means bias the pad elements away from each other. This arrangement is provided in order to ensure that there will be some degree of progressive engagement of the clutch. This leads to a requirement that the above mentioned resilient means between the two pad elements of each friction pad must be of relatively high stiffness. Although this arrangement may seem to reduce the effect of uneven wear discussed above by enabling the pad elements to adjust with respect to each other, in practice it is found that, because of the high stiffness of the resilient biassing means, this wear compensation is not achieved to any great extent.

Accordingly, if the pad elements are to be able to perform satisfactory relative movement, the resilient means arranged between them would have to be of relatively low stiffness.

DISCUSSION OF THE INVENTION

An object of the present invention is to provide a clutch friction wheel which enables these conflicting requirements to be reconciled whereby the resilient means have a sufficiently low stiffness to enable the pad elements to adjust in order to compensate for wear in the pressure and reaction plates, while still being able to exert sufficient reaction force to obtain a predetermined degree of progressive engagement of the clutch.

According to the invention therefore, a clutch friction wheel of the kind set forth under the heading "Field of the Invention" above is, in general terms, characterised in that the resilient means acting between the pad elements of the friction pads comprise at least one resilient ring of the Belleville ring type which is precompressed in such a way that, within the limits of the relative axial movement between the two pad elements defined by the said abutment means, the resistance of the Belleville ring or rings to further compression remains substantially constant.

As is well known, the mechanical resistance, or reaction force, exerted by a Belleville ring varies according to its degree of axial compression, with its characteristic curve having a portion over which the reaction force is substantially constant over an intermediate part of the curve which begins beyond the point of zero compression and ends before the point at which the ring is flat. Over this flat intermediate part of the curve, the stiffness of the Belleville ring is virtually zero. It is this phenomenon that is used to advantage in the present invention.

In other words, the invention is carried out in such a way that the Belleville ring, of relatively high intrinsic stiffness, works only in that part of its characteristic curve having a substantially zero gradient or constant level, at which the reaction force which it exerts is substantially constant. Accordingly, the two pad elements of each friction pad are effectively able to move with respect to each other without the load imposed by the resilient means acting between them being changed.

The effect is as though one of the pad elements (and this pad element is preferably the one which is arranged to cooperate with the pressure plate of the clutch) is mounted so as to float, so that this pad element can best conform to any conical distortion of the pressure plate.

The various features and advantages of the invention will appear more clearly from the description, given below, of preferred embodiments of the invention. This description is given by way of example only and with reference to the diagrammatic drawings accompanying this specification.

BRIEF DESCRIPTION OF THE DRAWINGS

FIG. 1 is an elevation showing part of a friction clutch wheel in accordance with the invention in a first embodiment, seen in the direction of the arrow I in FIG. 2.

FIG. 2 is a cross section taken on the line II—II in FIG. 1.

FIG. 3 is a cross section taken on the cranked line III—III in FIG. 1.

FIG. 4 is a characteristic curve for the resilient rings incorporated in the clutch wheel of FIGS. 1 to 3.

FIG. 5 is a view similar to FIG. 1 but showing a second embodiment of clutch wheel in accordance with the invention.

FIG. 6 is a cross section taken on the line VI—VI in FIG. 5.

FIG. 7 is a cross section taken on the line VII—VII in FIG. 5.

FIG. 8 is a view similar to FIG. 1, but showing a clutch wheel in a third embodiment of the invention.

FIG. 9 is a cross section taken on the line IX—IX in FIG. 8.

FIG. 10 is a cross section taken on the line X—X in FIG. 8.

FIG. 11 is a further view generally similar to FIG. 1, but showing a fourth embodiment of the invention.

FIG. 12 is a cross section taken on the line XII—XII in FIG. 11.

FIG. 13 is a cross section taken on the line XIII—XIII in FIG. 11.

FIG. 14 is another view generally similar to FIG. 1, but shows a clutch wheel in a fifth embodiment of the invention.

FIG. 15 is a cross section taken on the line XV—XV in FIG. 14.

FIG. 16 is a view similar to FIG. 14 but showing a sixth embodiment of the invention.

FIG. 17 is yet another view similar to FIG. 1, but in this case it shows a seventh embodiment of the invention.

FIG. 18 is a cross section taken on the line XVIII—XVIII in FIG. 17.

FIG. 19 is yet a further view generally similar to FIG. 1, and like the other Figures stated as being similar to FIG. 1 it is a scrap elevation showing part of a clutch wheel, the latter being in this case an eighth embodiment of the invention.

FIG. 20 is a cross section taken on the line XX—XX in FIG. 19.

DESCRIPTION OF PREFERRED EMBODIMENTS OF THE INVENTION

Figure 21:
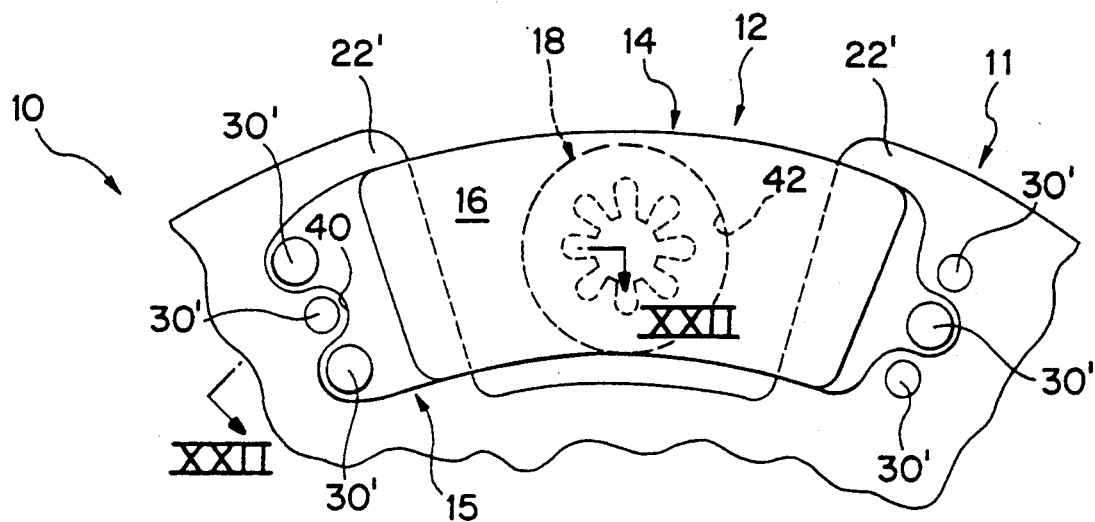
FIG. 21 is generally similar to FIG. 11, but shows a ninth embodiment of the invention.

The friction clutch wheel according to the invention, which is shown in various forms in the drawings, is indicated at 10 and is typically intended for incorporation in a plate-type clutch for a motor vehicle. The wheel 10 comprises a clutch disc 11 which is of metal, and which is generally circular and quite thin, with a plurality of friction pads 12 carried by the clutch disc 11. The friction pads 12 are distributed on a pitch circle coaxial with the clutch disc. Each friction pad comprises two pad elements 14 arranged back to back and on either side of the clutch disc 11. The pad elements 14 of each pad 12 are mounted for axial movement with respect to each other under the influence of resilient means mounted between the two pad elements and described in greater detail below. This movement consists of a controlled and predetermined relative axial displacement which is limited by abutment means which will also be described in greater detail below.

In the present example, each pad element 14 comprises a support or backing plate 15 and a block 16 of friction material 16 carried by the backing plate 15. The above mentioned resilient means acting between the two pad elements of a pair comprise at least one resilient ring 18 of the Belleville ring type, mounted between the backing plates 15. The two blocks 16 in each friction pad 12 are exposed on opposite sides of the clutch disc 11.

In FIGS. 1 to 3, each friction pad 12 has a single resilient ring 18 in the form of a separate component having at least one retaining lug 19 engaging with a stop surface defined in a fixed position with respect to the clutch disc, i.e. as part of the clutch disc 11 or of a further component which is mounted on the latter. As shown in FIGS. 1 to 3, the resilient ring 18 has only one of these lugs 19, extending at its outer periphery along the tangential edge of the friction pad 12 which lies nearest to the axis of the assembly in the radial sense. This lug 19 is engaged in a slot 20 extending in a chordal direction and formed through the clutch disc 11. The ring 18 also has, in this example, a set of radial notches 21 formed in its inner periphery.

In FIGS. 1 to 3, both of the pad elements 15 of each friction pad 12 are arranged to move axially with respect to the clutch disc 11, and it will be noted that both of their backing plates 15 lie on the same side of the latter. One of the friction blocks 16 lies in a window 22, of the same shape as the friction block 16, formed through the clutch disc 11. Accordingly, the backing plate 15 of that pad element is on the opposite side of the clutch disc from the side on which its block 16 of friction material is exposed.

The abutment means mentioned above, limiting the relative axial displacement between the two pad elements 14 of each friction pad, are accordingly partly defined by the above arrangement. For the rest, the abutment means are defined by virtue of the fact that the backing plate 15 of the other pad element 14 has at least one lug 24 which passes through the clutch disc 11 through a transverse slot 25 (see FIG. 1) formed through the clutch disc 11. Each lug 24 has an inwardly facing tab portion 26 formed at its free end on the opposite side of the clutch disc 11 from the main part of the backing plate 15.

In the present example, the relevant backing plate 15 in each pad 12 has four of these lugs 24, arranged in pairs on its opposed side edges, with the tab portions 26 of each pair of lugs 24 pointing towards those of the other pair of lugs. Each pair of lugs 24 at the same side of the backing plate 15 pass through a common transverse slot 25, so that as can be seen, there are two of these slots 25 parallel to each other. About halfway between the lugs 24 at each end of the backing plate 15, the latter is formed with a tongue 27, extending in the opposite direction from the tab portions 26 of those lugs and lying on the opposite side of the clutch disc 11, for abutting engagement with the latter.

In this example, the pad elements 14 of which the backing plates 15 are formed with the lugs 24 are arranged to cooperate with the pressure plate 100 (FIG. 2) of the clutch, while the other pad element 14 is arranged to cooperate with the reaction plate 101 of the clutch.

The diagram seen in FIG. 4 shows the general shape of the characteristic curve of the axial reaction force R applied by the Belleville ring 18 as a function of its axial compressive deformation F. It will be noted that between two values $F_1$ and $F_2$ of the deformation F, the curve has a portion P in which the reaction force R is substantially constant. An important feature of the friction clutch wheel is that the resilient ring 18 always works within this portion p of the curve. In other words, the ring 18 is prestressed between the associated pad elements 14 in such a way that its reaction force is substantially constant between the limits of pad element displacement defined by the abutment or stop elements comprising the interface between one of the backing plates 15 and the clutch disc 11 together with the tab portion 26 and tongue 27 of the other backing plate 15. It follows of course that the Belleville ring 18 is never fully compressed. The various components are so dimensioned that, in the rest or "clutch disengaged" position, the ring 18 is compressed by an amount substantially equal to $F_1$, while in the condition in which the pad elements 14 are closest together, the ring 18 is compressed by the amount $F_2$.

It will be noted that the pad element 14 associated with the reaction plate 101, FIG. 2, is able to rock by virtue of its loose fitting clearance in the window 22, so as to take account of the fact that the reaction plate 101 undergoes some deformation, due to wear, in relation to the pressure plate 100. The slots 25 enable the other pad element 14 to rock by a larger amount, due to the ample clearance within the slots 25 which can be seen in FIG. 1.

Reference is now made to FIGS. 5 to 7 showing the second embodiment. In this arrangement, each friction pad 12 includes two resilient rings 18, offset circumferentially from each other. Each of these resilient rings is integral with the clutch disc 11 or with a component carried by the latter, so as to ensure retention of the resilient rings on the clutch disc. However, as shown in FIGS. 5 to 7, the resilient rings 18 are integral with the clutch disc 11 itself, being joined to the latter through a bridge portion 19' at the radially inner side of the outer periphery of the ring 18. This arrangement improves the seating of the pad elements 14. In addition, the pad elements 14 of each friction pad 12 extend on either side of the clutch disc 11. In other words, the backing plates 15 of both of the pad elements are on the same side of the clutch disc 11 as their own respective blocks 16 of friction material.

The support plate 15 of each of the pad elements 14 has a single one of the lugs 24 in this example, arranged at one end of the backing plate. The lugs 24 lie at opposite ends of the pad 12, with each lug passing through a respective transverse slot 25 and also, in this case, through a further transverse slot 28 formed in a corresponding position in the other backing plate 15. Thus, as can be seen in FIG. 7, the terminal tab portion 26 of each lug 24 lies against the outer side of the other backing plate, and, as will also be observed, in this case each tab portion 26 points away from the associated friction block 16.

Referring now to the third embodiment shown in FIGS. 8 to 10, in this arrangement only one of the pad elements of a given friction pad 12 is displaceable axially with respect to the clutch disc 11. This movable pad element is the one which cooperates with the pressure plate 100 of the clutch. The other pad element 14, which lies in register with the window 22 formed in the clutch disc 11, is secured to the latter by means of rivets 30, for which purpose its backing plate 15 is provided with ears 31 projecting in a generally chordal direction on either side of the window 22. This fixed backing plate 15 also carries a pair of the lugs 24 at each side as can be seen in FIG. 8, so as to constitute the abutment or stop means for limiting the axial movement of the other pad element 14. The lugs 24 extend through the window 22 in the clutch disc 11, and each lug 24 has a tab portion 26 lying on the outer side of the backing plate of the movable pad element 14 and pointing towards the friction block 16 of the latter. It should be noted that both of the pad elements 14 of a given friction pad 12, together with the associated resilient ring 18 between them, constitute a sub-assembly which can be pre-assembled, thus simplifying the fitting of the pad to the clutch disc.

Reference is now made to FIGS. 11 to 13 showing the fourth embodiment. In this case, one of the pad elements of each friction pad 12 is again secured to the clutch disc 11. However, the abutment means limiting this movement are defined by securing the pad element to the clutch disc by means of shouldered pins 30', carried by the clutch disc 11 and extending through the backing plate 15 of the other pad element 14. In addition, each friction pad 12 extends, in this example, between two radial lugs 22' of the clutch disc 11. The shouldered pins 30' are carried by these radial lugs 22'. Each pad 12 in this embodiment has two resilient rings 18, which are separate components like the single ring 18 in FIGS. 1 to 3. However, in this fourth embodiment each ring 18 is individually retained in position by engagement on a retaining member 33 which is carried indirectly by the clutch disc 11. These retaining members 33 comprise shouldered pins which extend from one backing plate 15 to the other backing plate of the same friction pad 12, being carried by one backing plate and passing through the other. In the version shown in FIGS. 12 to 13, the pad element 14 in which the backing plate 15 carries the retaining pins 33 is the pad element which is movable with respect to the clutch disc 11. In order to accommodate the retaining pins 33, each of the two blocks 16 of friction material is divided into two parts 16' and 16''.

In the four further embodiments shown variously in FIGS. 14 to 20, a generally annular counter plate 35 is carried by the clutch disc 11, to which it is secured by means of shouldered studs 36. Both the clutch disc 11 and its counter plate 35 are formed with respective windows 22 associated with each friction pad 12. In each friction pad 12, both of the pad elements 14 are arranged for axial movement, and the abutment means that limit this relative axial displacement are defined by virtue of the fact that each of the two backing plates 15 lies on the side of the clutch disc 11, or of the counter plate 35 as the case may be, that is opposite to the side on which the respective friction block 16 is located. In respect of at least that one of the pad elements 14 that is associated with the pressure plate of the clutch, a radial fitting clearance is of course provided between that pad element and the corresponding window 22 in the clutch disc 11, to enable the pad element to rock with respect to the latter in the manner described with reference to FIGS. 1 to 3.

In the fifth embodiment seen in FIGS. 14 and 15, each friction pad 12 has a single resilient ring 18, while in the sixth embodiment (FIG. 16), there are two. In both these cases shouldered pins 33, as already described with reference to FIGS. 11 to 13, are provided for retaining the rings 18 in position, while in the seventh embodiment (FIGS. 17 and 18), the retaining means for the rings 18 comprise lugs 19 similar to those described with reference to FIGS. 1 to 3. However, in the case shown in FIGS. 17 and 18, there are two lugs 19 for each resilient ring 18, with one lug 19 following a tangential edge of the pad elements 14 while the other follows the corresponding lateral edge of the latter.

In the eighth embodiment seen in FIGS. 19 and 20, each friction pad 12 again has two resilient rings 18. However, in this case the two rings 18 are joined together through an ear portion 38, sandwiched between the clutch disc 11 and the counter plate 35, with the ear portion 38, the clutch disc and the counter plate all being secured together by means of a rivet 39. The rings 18 are thus also secured to the counter plate 35.

Figure 22:
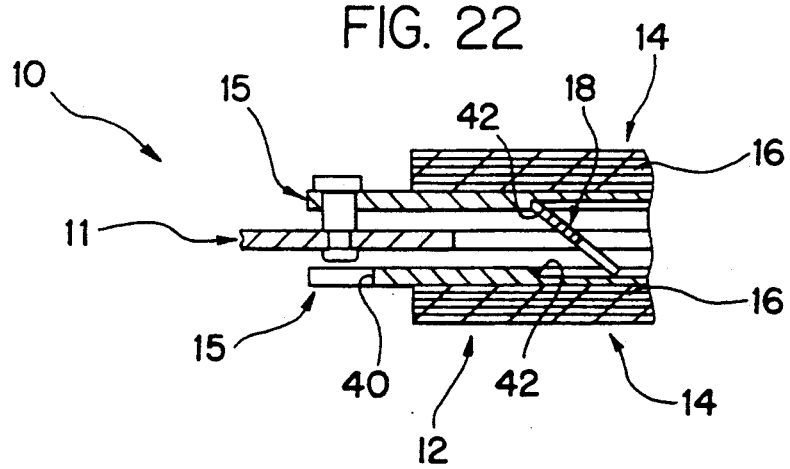
FIG. 22 is a cross section taken on the line XXII—XXII in FIG. 21.

Reference is now made to FIGS. 21 and 22 showing a ninth embodiment of the invention. In this arrangement, each friction pad 12 is disposed between two radial lugs 22' of the clutch disc 11 in the same way as was shown in FIGS. 11 to 13. However, in this case the pad elements 14, which are identical to each other, are each secured to the clutch disc 11 by means of shouldered pins 30'. These are arranged in the alternate relationship seen in FIGS. 21 and 22, with two pins 30' on one side and only one on the other. At the end of each pad element 14 that has a single pin 30', the latter is aligned with a notch 40 formed in the backing plate 15 of the other pad element 14. In this example there is only one resilient ring 18 between the two pad elements 14. This ring 18 is retained in position by being engaged at its outer periphery in a rebate 42 which is formed for this purpose in the outer surface of the support or backing plate 15 of either one of the pad elements 14.

The present invention is not restricted to the various embodiments described above and shown in the drawings, but embraces all possible variants, especially as regards the means for maintaining the resilient rings in position. However, in all cases at least one of the pad elements of each friction pad, and preferably always the one that cooperates with the pressure plate of the clutch, is arranged to be able to rock with respect to the clutch disc so as to compensate for any conical deformation of the pressure plate. This leads to reduction in wear of the friction pads, and the torque transmitted by the clutch remains substantially constant even when the pressure plate has become significantly worn into a conical shape.

It should be noted that the specification of United Kingdom published patent application No. GB 2140881A discloses an arrangement which employs Belleville rings; but in that specification, the Belleville rings are spaced away from the pad elements of each friction pad, circumferentially between the latter, while the precompression of the Belleville rings is different from that in the clutch wheel according to the invention. In the arrangement disclosed in the above mentioned United Kingdom patent specification, the friction pad elements are mounted for camming movement so as to ensure progressive engagement of the clutch. This leads to increased wear of the friction pads and a reduction in the ability of the latter to become adapted to deformation of the pressure plate.

It is of course possible to obtain progressive engagement by causing the latter to take place at the level of the pressure plate in the way described in the specification of U.S. Pat. No. 4,828,083.

What is claimed is:

1. A friction wheel for a clutch comprising a clutch disc and a plurality of friction pads distributed on a pitch circle coaxial with the clutch disc, each friction pad comprising two pad elements lying back to back and resilient means interposed between the two pad elements, with the pad elements projecting on either side of the clutch disc, wherein the clutch disc includes mounting means for mounting the pad elements of each friction pad thereon for axial relative movement between the pad elements under the influence of said resilient means, the clutch wheel further comprising abutment means defined by at least one of said pad elements of each friction pad, said abutment means defining a range of said relative movement between said pad elements within predetermined limits, and wherein said resilient means comprise at least one precompressed resilient ring of the Belleville ring type, said abutment means being so arranged, and the precompression of the resilient means being such, that the resilient means apply a substantially constant reaction force over substantially the whole range of said relative movement.

2. A friction wheel according to claim 1, including means fixed with respect to the clutch disc and defining at least one stop surface, wherein each said resilient ring is a separate component having at least one lug for engagement with a said stop surface, whereby to retain the resilient ring or rings in position.

3. A friction wheel according to claim 1, wherein each said resilient ring is a separate component, the clutch wheel further including at least one fastening member fixed with respect to the clutch disc and retaining the resilient ring in position.

4. A friction wheel according to claim 1, including an element fixed with respect to the clutch disc, wherein each said resilient ring is integral with the said fixed element.

5. A friction wheel according to claim 1, wherein said means mounting the pad elements of each friction pad on the clutch disc carry the pad elements of the friction pad for axial movement of both pad elements with respect to the clutch disc.

6. A friction wheel according to claim 1, wherein each friction pad comprises a first pad element for cooperating with a pressure plate of the clutch, the means for mounting the friction pads on the clutch disc comprising means mounting each said first pad element for axial movement with respect to the clutch disc and means securing the other pad element fixedly to the clutch disc.

7. A friction wheel according to claim 1, wherein each friction pad has only one said resilient ring.

8. A friction wheel according to claim 1, wherein each said friction pad has two said resilient rings.

9. A friction wheel according to claim 1, wherein the friction disc is formed with a plurality of windows, with at least one said pad element of each friction pad being in engagement with a respective said window.

10. A friction wheel according to claim 1, wherein each said pad element comprises a backing plate and a block of friction material carried by the backing plate, each of said blocks being exposed on a side remote from the clutch disc, said abutment means associated with each friction pad being arranged in a manner wherein said backing plate of at least one of the two pad elements includes at least one lug having a laterally projecting terminal tab disposed on an opposite side of the clutch disc relative to said at least one of the two pad elements.

11. A friction wheel according to claim 1, wherein each said pad element comprises a backing plate and a block of friction material carried by the backing plate, each of said blocks being exposed on a side remote from the clutch disc, said abutment means associated with each friction pad being arranged in a manner wherein said backing plate of at least one of the two pad elements includes at least one lug having a laterally projecting terminal tab disposed on a side of the backing plate of the other pad element remote from the side on which said block of the pad element having said tab is exposed.

12. A friction wheel according to claim 1, wherein each said pad element comprises a backing plate and a block of friction material carried by the backing plate, each of said blocks being exposed on a side remote from the clutch disc, said abutment means associated with each friction pad being arranged in a manner wherein said backing plate of at least one pad element of each pad lies on a side of the clutch disc opposite of the side on which said block of friction material of the same pad element is exposed.

13. A friction wheel according to claim 1, wherein each said pad element comprises a backing plate and a block of friction material carried by the backing plate, each of said blocks being exposed on a side remote from the clutch disc, wherein said friction wheel further includes at least one shoulder fastening member carried by the clutch disc and corresponding to each said pad, said backing plate of at least one of said pad elements of each friction pad having said shouldered fastening member extending through it.

* * * * *